United States Patent [19]
Hirofuji

[11] Patent Number: 5,422,013
[45] Date of Patent: Jun. 6, 1995

[54] DEVICE AND METHOD OF PRODUCING PURE WATER

[75] Inventor: Yuichi Hirofuji, Osaka, Japan

[73] Assignee: Matsushita Electric Industrial Co., Ltd., Osaka, Japan

[21] Appl. No.: 61,074

[22] Filed: May 14, 1993

[30] Foreign Application Priority Data

May 15, 1992 [JP] Japan .................. 4-123128

[51] Int. Cl.⁶ .................. C02F 1/72; B01D 17/12
[52] U.S. Cl. ............................ 210/739; 210/96.1; 210/188; 210/259; 210/750; 210/758; 210/900; 95/8; 96/156
[58] Field of Search .............. 210/96.1, 96.2, 143, 210/192, 259, 188, 651, 748, 739, 750, 758, 808, 900, 763; 422/186, 64, 186.3; 436/138, 146; 204/153.16, 153.2, 406; 134/902; 96/6, 156, 193; 95/8, 45, 266

[56] References Cited

U.S. PATENT DOCUMENTS

| | | | |
|---|---|---|---|
| 3,870,033 | 3/1975 | Faylor et al. | 210/900 |
| 4,863,608 | 9/1989 | Kawai et al. | 210/900 |
| 4,879,041 | 11/1989 | Kurokawa et al. | 210/900 |
| 4,990,260 | 2/1991 | Pisani | 210/748 |
| 5,061,374 | 10/1991 | Lewis | 210/900 |
| 5,073,268 | 12/1991 | Saito et al. | 210/748 |
| 5,118,422 | 6/1992 | Cooper et al. | 210/748 |
| 5,124,033 | 6/1992 | Ohmi et al. | 210/900 |

FOREIGN PATENT DOCUMENTS

| | | | |
|---|---|---|---|
| 2-126992 | 5/1990 | Japan | 210/900 |
| 2-152589 | 6/1990 | Japan | 210/900 |
| 3224602 | 10/1991 | Japan | 96/6 |

*Primary Examiner*—Joseph W. Drodge
*Attorney, Agent, or Firm*—Willian Brinks Hofer Gilson & Lione

[57] ABSTRACT

A flow passage into which water-to-be-treated flows is provided with, in order from an upstream side, a deaerator as a DO eliminating device having a power variable mechanism, an oxidation device for oxidizing TOC by irradiating ultraviolet-ray, an ion eliminating device for eliminating TOC ion generated at oxidation, and a particle eliminating device. Further provided thereat are a TOC density measuring device, a DO density measuring device and a data processing device. Before the water-to-be-treated is irradiated with ultraviolet-ray in the TOC eliminating device (oxidation device and ion eliminating device), the deaerator controls a DO density in the water-to-be-treated according to a TOC density. Thus, an oxidizer of the TOC is maintained and impurity is decreased.

4 Claims, 6 Drawing Sheets

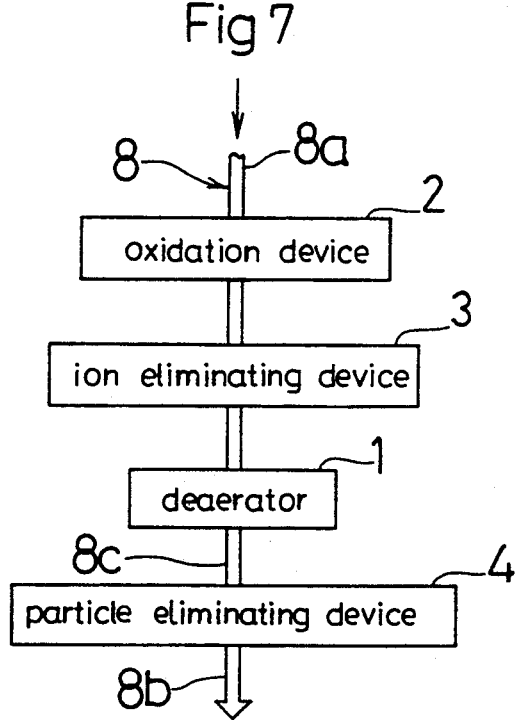
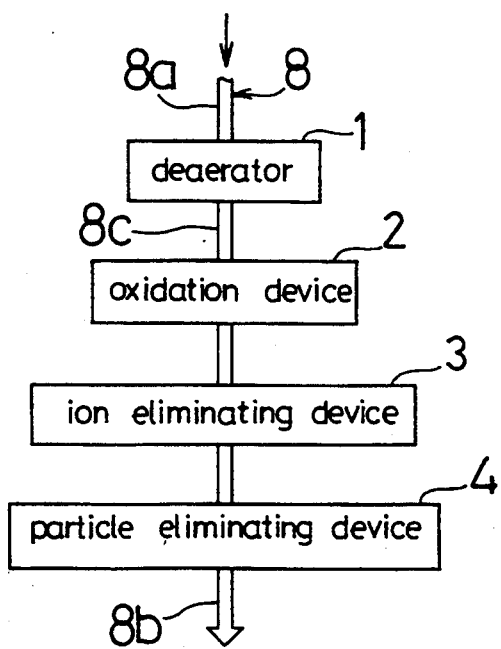

DEVICE AND METHOD OF PRODUCING PURE WATER

BACKGROUND OF THE INVENTION

This invention relates to a device and a method of manufacturing pure water used at a manufacturing process of a semiconductor device, and particularly relates to a device and a method of manufacturing pure water with reduced densities of dissolved oxygen and total organic carbon.

Recently, a property required to a ultra LSI device becomes severe accompanied by formation of micropattern and there rises a problem of trace level contamination to a device at a manufacturing process. In order to prevent the trace level contamination, it is necessary at first to eliminate surface contamination of a semiconductor substrate on which the device is formed. Therefore, a technique of purifying a cleaning agent for cleaning the surface of the substrate is being developed to have high purity. In a cleaning process, pure water (ultrapure water with extremely less impurity) used for eliminating the cleaning agent remaining on the surface of the substrate is also required to have high purity. It is being cleared that a performance of the semiconductor device is remarkably increased by decreasing densities of total organic carbon (herein after referred to it as TOC) and dissolved oxygen (herein after referred to it as DO) in the pure water.

As a method for decreasing the density of DO in the pure water, Japanese Patent Application Laying Open Gazette No. 2-126992 discloses, in addition to a method that oxygen is substituted with nitrogen under a reduced pressure, a membrane deaeration method in which the pure water flows in a micro pipe made of resin capable of transmitting gas and a gas dissolved in the pure water is eliminated by reducing pressure outside of the micro pipe. This method is effective for a case where nitrogen deteriorates the device characteristics.

Japanese Patent Application Laying Open Gazette No. 2-152589 proposes a method for eliminating TOC by irradiating ultraviolet-ray to pure water into which hydrogen peroxide $H_2O_2$ is implanted (or ozone is implanted directly). In detail, oxygen atom is generated in such a manner that $H_2O_2$ particularly absorbs ultraviolet-ray of shorter wavelength than 365 nm and $O_3$ particularly absorbs 254 nm ultraviolet-ray, which causes generation of OH radical in the presence of water. Then, organic matter is finally resolved by the OH radical into $H_2O$ and $CO_2$.

The TOC eliminating method by implanting hydrogen peroxide and irradiating ultraviolet-ray, however, requires devices and processes for eliminating hydrogen peroxide remaining after implant of the hydrogen peroxide and oxidation. This involves a complicated construction of the pure water manufacturing device and increase of processes, thus raising the manufacturing cost.

For avoiding the problem accompanied by the hydrogen peroxide implant, "Chemical Engineering", Vol. 5, No. 6 (1987), pages 435-440, discloses that without the hydrogen peroxide implant, the TOC is oxidized by only irradiating short-wavelength ultraviolet-ray (ozone ray) of, for example, 184.9 nm by a low pressure mercury-vapor lamp. This method utilizes the fact that OH radical is generated by dissolving water by an energy of irradiation of the short-wavelength ultraviolet-ray, so that hydrogen peroxide implant is not required. A ultraviolet irradiating device according to the method such as NMS-type TOC-UV by NOMURA MICRO SCIENCE CORPORATION is put into practice.

When the pure water is manufactured by combination of elimination of the TOC by irradiating the short-wavelength ultraviolet-ray and elimination of DO according to the membrane deaeration method, however, following problems arise.

For example, as shown in FIG. 7, when an oxidation device 2 for oxidizing TOC by irradiating the short-wavelength ultraviolet-ray, an ion eliminating device 3 for eliminating ion caused by oxidation of TOC, a membrane deaerator 1 for eliminating DO according to the membrane deaeration method and a particle eliminating device 4 are provided in order at a passage for treating pure water, the TOC is effectively eliminated by the ion eliminating device 3. However, when DO is eliminated by the membrane deaerator 1 after the TOC is eliminated, an TOC component increases by dissolving an eluent from a resin micro pipe of the membrane deaerator 1.

On the other hand, as shown in FIG. 8, when the membrane deaerator 1, the oxidation device 2, the ion eliminating device 3 and the particle eliminating device 4 are provided in order at the passage for treating pure water, the TOC component eluted from the membrane deaerator 1 is eliminated by the oxidation device 2 and the ion eliminating device 3. As a result the TOC density might be extremely low.

However, it is confirmed that the TOC density can hardly be decreased further than a certain degree even when the short-wavelength ultraviolet-ray is irradiated by the oxidation device 2 after deaeration by the membrane deaerator 1. This seems because even with OH radical generated by irradiating the short-wavelength ultraviolet-ray, organic matter with less oxidizing efficiency exists and DO is necessary for accelerating oxidation of tile organic matter. In other words, the TOC density cannot be decreased because an oxidizer also fades when the DO density in the pure water is extremely low at the irradiation of the short-wavelength ultraviolet-ray.

According to an experiment, when the short-wavelength ultraviolet-ray is irradiated to the water-to-be-treated without deaeration, the TOC density before deaeration is not more than 1 ppb. The DO density in the pure water after treatment depends on the DO density in the water-to-be-treated and is 50-100 ppb. When the water-to-be-treated is deaerated before short-wavelength ultraviolet-ray irradiation, the TOC density after the irradiation is about 5-10 ppb. This indicates contribution of DO to oxidation of the TOC by the ultraviolet-ray irradiation.

Accordingly, with either of the methods, the DO density is decreased with no decrease Of the TOC density, and vice versa. That is, it is difficult to decrease both densities of DO and TOC.

The present invention has its object of providing a method and a device of manufacturing pure water with less impurity by decreasing the densities of DO and TOC in such a manner to providing a device for eliminating TOC by oxidizing the TOC utilizing DO without implant of hydrogen peroxide and means for controlling an amount of DO in water-to-be-treated at an upstream side to an adequate value.

SUMMARY OF THE INVENTION

A pure water manufacturing device for manufacturing high-purity pure water by eliminating DO and TOC in water-to-be-treated, comprises: a DO eliminating device having a power variable mechanism; a TOC eliminating device having a mechanism for oxidizing TOC utilizing DO in the water-to-be-treated after treatment by said DO eliminating device; DO density detecting means for detecting a density of DO remaining in the water-to-be-treated treated by said DO eliminating device; TOC density detecting means for detecting a density of TOC in the water-to-be-treated; and power control means for controlling a power of said DO eliminating device according to the density of DO detected by said DO density detecting means and the density of TOC detected by said TOC density detecting means.

Accordingly, the DO density in the water-to-be-treated before treatment at the TOC eliminating device is adequately maintained, which makes an oxide required for oxidizing the TOC in the water-to-be-treated also maintained. Therefore, in the pure water treated at the TOC eliminating device, the density of TOC which includes TOC generated at the DO eliminating device is restrained low and the DO density is also restrained low, thus obtaining ultrapure water with trace level impurities.

The power is controlled according to following methods.

The power control means controls the power of said DO eliminating device so as to minimize a total density of DO and TOC after treatment by said TOC eliminating device.

As a result, optimum ultrapure water used in a field in which both DO and TOC hinder is obtainable.

The power control means controls the power of said DO eliminating device so as to minimize the density of TOC after treatment by said TOC eliminating device.

As a result, optimum ultrapure water used in a field in which TOC hinders is obtained.

The power control means controls the power of said DO eliminating device so as to minimize the density of DO after treatment by said TOC eliminating device.

As a result, optimum ultrapure water used in a field in which DO hinders is obtained.

The DO density detecting means and said TOC density detecting means detect the respective densities of DO and TOC in the water-to-be-treated after treatment by said TOC eliminating device, and said power control means feed-back-controls the power of said DO eliminating device.

Accordingly, the amount of DO at the inlet of the TOC eliminating device is automatically adjusted to a required value for oxidizing the TOC. In this case, by controlling the DO density according to a detected value at the outlet, the densities of TOC and DO in the finally obtained pure water are lowered.

The pure water manufacturing device further comprises: adequate power calculating means, which receives outputs of said TOC density detecting means and said DO·density detecting means, for estimating and calculating an adequate power of said DO eliminating device so that an amount of DO is sufficient for oxidizing the TOC, wherein said DO density detecting means detects the density of DO in the water-to-be-treated after treatment by said DO eliminating device and before treatment by said TOC eliminating device, said TOC density detecting means detects the density of TOC in the water-to-be-treated before treatment by said TOC eliminating device, and said power control means controls the power of said DO eliminating device so as to accord with an adequate power value calculated by salad adequate power calculating means.

Accordingly, the DO density in the water-to-be-treated before treatment at the TOC eliminating device is adjusted so as to accord with an amount to be used for oxidizing TOC beforehand. Thus, the deaerating power is feed-forward-controlled, so that control instability such as hunting is prevented.

BRIEF DESCRIPTION OF THE ACCOMPANYING DRAWINGS

FIG. 7 is a block diagram showing a construction of a pure water manufacturing device provided in order with an oxidation device, an ion eliminating device, a deaerator and a particle eliminating device, under no control of DO density.

FIG. 8 is a block diagram showing a construction of a pure water producing device provided in order with the deaerator, the oxidation device, the ion eliminating device, and the particle eliminating device, under no control of DO density.

PREFERRED EMBODIMENT OF THE PRESENT INVENTION

Description is made below about preferred embodiments of the present invention, with reference to accompanying drawings. In first and second embodiments, ultrapure water is manufactured from deionized water of raw water treated according to a reverse osmosis method and an ion exchanging method.

(FIRST EMBODIMENT)

Figure 1:
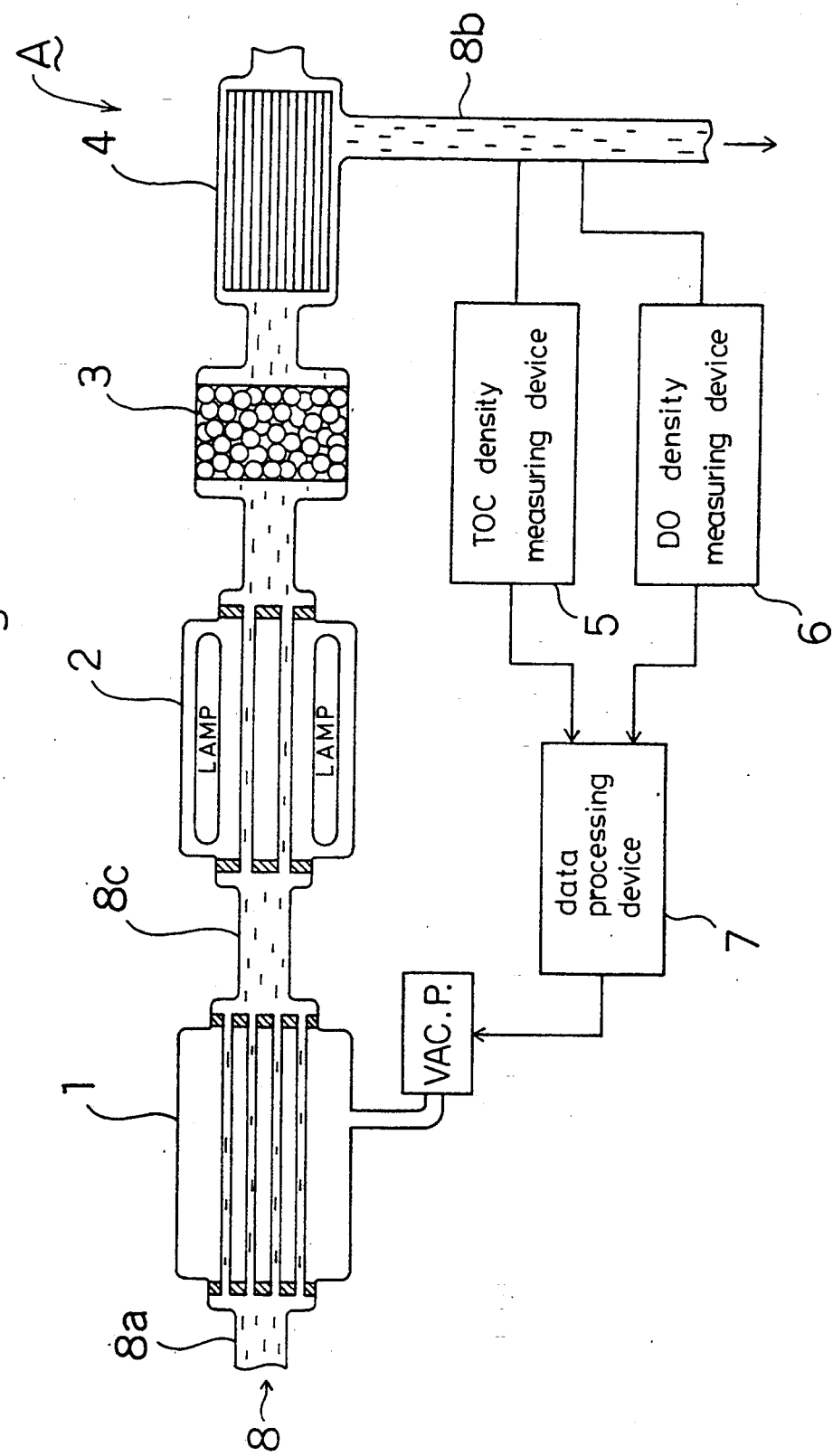
FIG. 1 is a diagram showing a construction of a pure water manufacturing device according to a first embodiment.

FIG. 1 shows a construction of a ultrapure water manufacturing device A in the first embodiment, wherein a flow passage 8 into which water-to,be-treated flows is provided with a deaerator 1, an oxidation device 2, an ion eliminating device 3 and a particle eliminating device 4 in order from an upstream side. Reference numerals 5 and 6 indicate respectively a TOC density measuring device and a DO density measuring device both provided at an outlet 8b of the flow passage 8. Reference numeral 7 indicates a data processing device as power control means.

At an inlet 8a of the deaerator 1, the deionized water of raw water is primarily treated according to the reverse osmosis method, the ion exchanging method and deaeration method and by a micro filter. The resistivity of the deionized water is about 16–17M $\Omega$ cm, the TOC density thereof is 50–100 ppb and the DO density thereof is 100–150 ppb. The deaerator 1 has plural micro pipes composed of micro-pored films to eliminate DO in such a manner that the water-to-be-treated flows in the micro pipes and the micro pipes are degasified from outside (membrane deaeration method). The oxidation device 2 oxidizes TOC by irradiating ultraviolet-ray having a component of short wavelength (184.9 nm) from a low pressure mercury-vapor lamp. The ion eliminating device 3 eliminates ion chiefly of carbonic ion generated by the ultraviolet-ray irradiation through an ion exchange resin (ion exchanging method). The particle eliminating device 4 eliminates particles according to ultrafiltration. The oxidation device 2 and the ion eliminating device 3 compose a TOC eliminating device.

Figure 3:
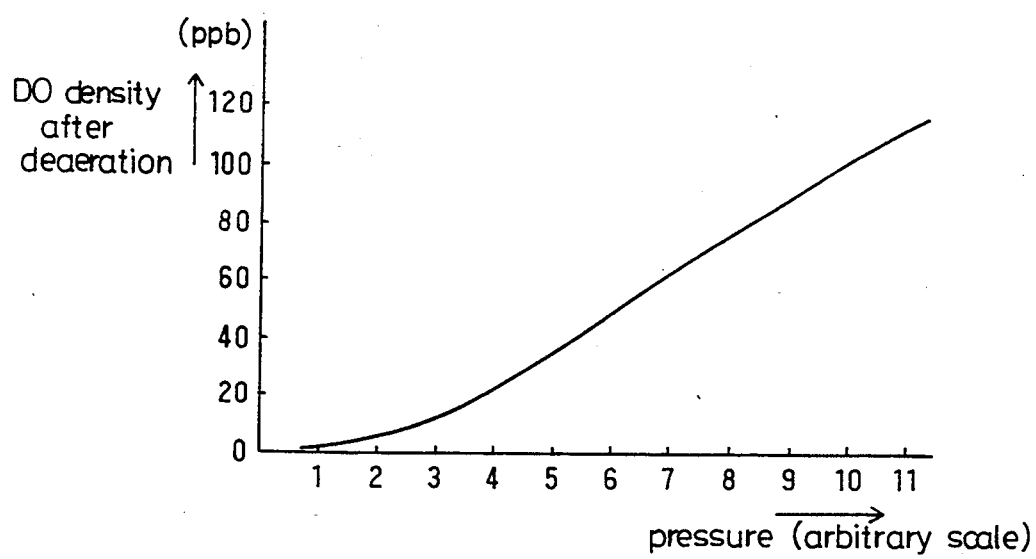
FIG. 3 is a graph showing dependency of pressure (power) in the deaerator to a DO density.

A vacuum in the deaerator 1 is controlled in such a manner that a nitrogen introducing part having an electric variable leak valve is provided at a middle of a vacuuming pipe and opening of the leak valve is adjusted. FIG. 3 shows a relation between a pressure in the deaerator 1 and the DO density at the outlet $8c$ of the deaerator 1 in case where the DO density at the inlet $8a$ of the deaerator 1 is almost constant, about 120 ppb. According to the relation, when a deaerating power increases, the pressure is reduced (or vacuum is increased) to decrease the DO density at the outlet $8c$. Inversely, when the deaerating power decreases, the DO density is increased. The vacuum may be adjusted by a hydraulic rotary pump, controlling a rotational speed thereof by an inverter.

Figure 4:
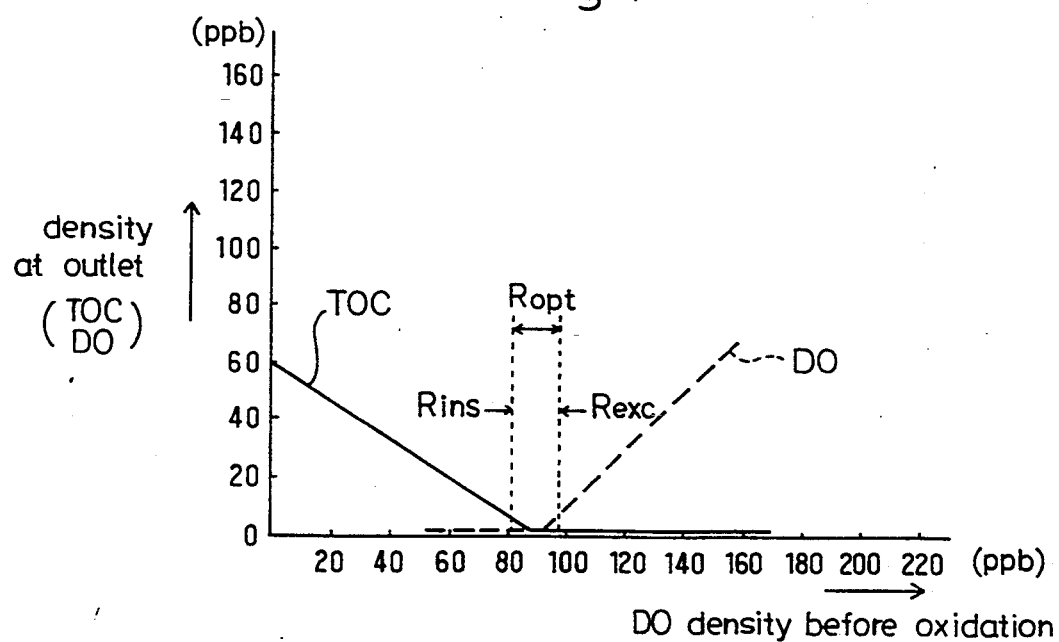
FIG. 4 is a graph showing dependency of a DO density before treatment to densities of TOC and DO after treatment.

FIG. 4 shows a fundamental dependencies of the density of DO before the ultraviolet-ray irradiation to the densities of TOC and DO, wherein the densities of TOC and DO of pure water obtained by changing the DO density before oxidation and by ultraviolet-ray irradiation and ion elimination are measured in case where the TOC density before oxidation by ultraviolet-ray irradiation is almost constant. According to the relation, when the DO density before oxidation is high with less deaerating power, the amount of DO exceeds a required value for oxidizing the TOC and the DO density after TOC elimination is high (within a range Rexc in FIG. 4). When the DO density before oxidation is low with more deaerating power, all DO is used up for oxidizing the TOC but the TOC is not oxidized fully. As a result, the TOC density after elimination of TOC is high (within a range Rins in FIG. 4). When the DO density before oxidation is within a set range Ropt, the amount of DO is a necessary and enough value for oxidizing the TOC, with a result that the densities of DO and TOC after elimination of the TOC are lowered.

Figure 2:
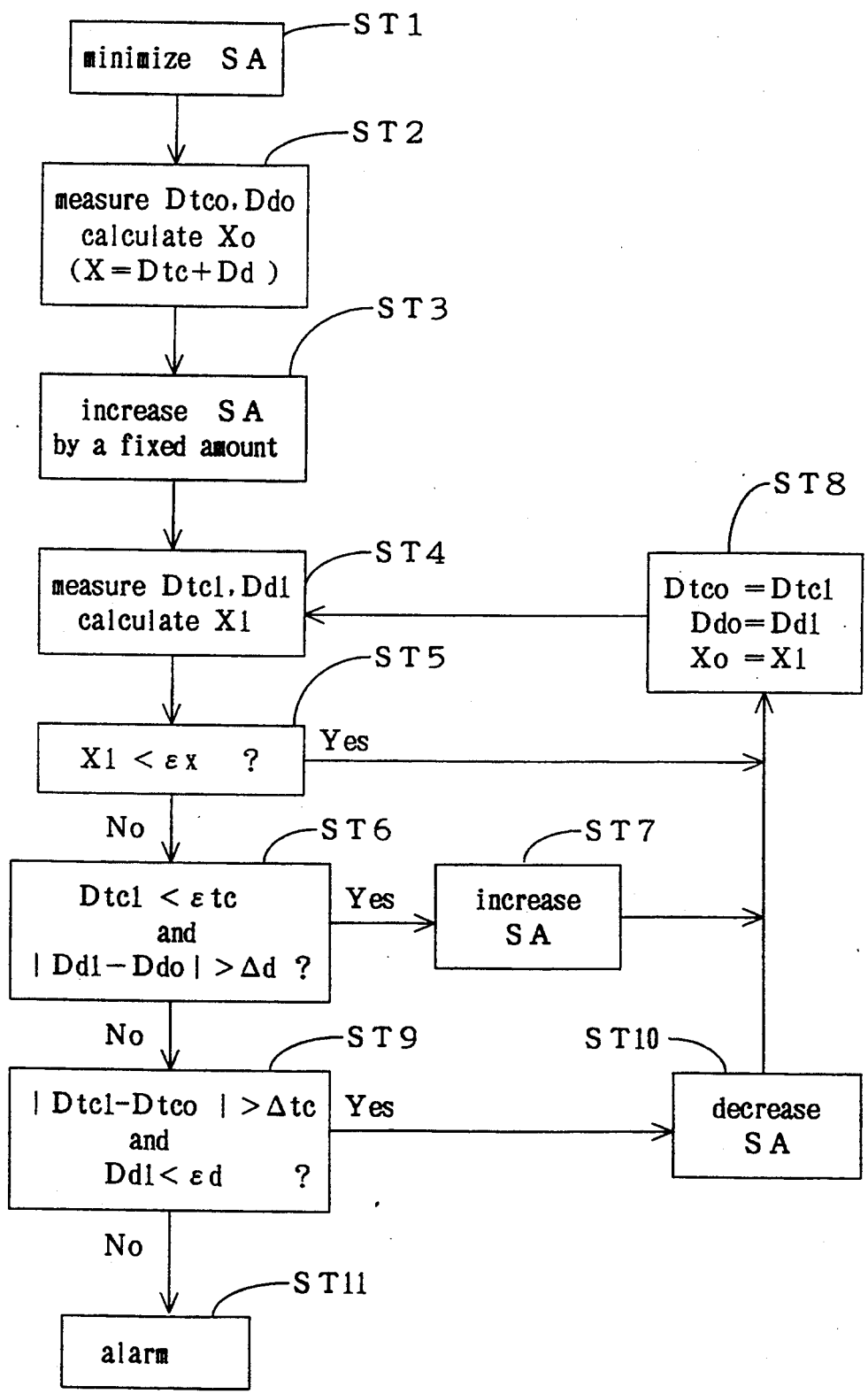
FIG. 2 is a flow chart for controlling a deaerating power of a deaerator in the first embodiment.

Described next is a control flow in the first embodiment and variation of the densities of TOC and DO along a flow chart of FIG. 2, with reference to FIG. 4. Wherein, the vacuum is adjusted based on a sampling measurement per three minutes for avoiding an unstable control caused by a large time delay which is involved even when the vacuum in the deaerator i is immediately controlled according to measured values of the densities of TOC and DO in the pure water.

At a step ST1, the deaerating power SA of the deaerator 1 is minimized to start the Control, and an initial value Dtc0 of the TOC density and an initial value Dd0 of the DO density are measured to calculate a total density X0 (X0=Dtc0+Dd0) at a step ST2. Then, the deaerating power SA of the deaerator 1 is increased by a fixed amount at a step ST3 and the TOC density Dtc1 and the DO density Dd1 after the deaerating power SA is increased are measured to calculate the total density X1 (X1=Dtc1+Dd1) thereof. At a step STS, judged is whether $X1 < \epsilon$ x (allowance for the total density). At this time, since the deaerating power is small, the DO has enough density for oxidizing all the TOC in the water-to-be-treated but is not used up for Oxidizing the TOC. Accordingly, the total density is rather high (within the range Rexc in FIG. 4), so that the judgment is NO to proceed to a step ST6.

At the step ST6, judged are whether the TOC density Dtc1 is lower than a previously set allowance $\epsilon$ tc and whether an absolute value of a difference between the DO density Dd1 and the previously measured value Dd0 is larger than a set judge value $\Delta$ d. At this time, since the TOC density Dtc1 is rather high, the judgment is YES to proceed to a step ST7 for increasing the deaerating power SA. After the step ST7, the initial values of the TOC density Dtc, the DO density Dd and the total density X are renewed at a step ST8, then the control returns to the step ST4. The steps ST4–ST8 are repeated. The increase amount of the deaerating power SA at the step ST7 is directly proportioned to $|X1 - \epsilon x|$.

During the control, when the total density is decreased to be in an adequate range Ropt, the DO has enough density Dd for oxidizing all the TOC and the total density X1 is lower than the allowance $\epsilon$ x (within the range Ropt in FIG. 4), so that the control proceeds from the step ST5 to the step ST8. At this time, when the deaerating power SA of the deaerator 1 exceeds an optimum ability, the DO is almost fully used up and the DO density Dd1 is minimized. However, an oxidizer required for oxidizing the TOC shorts, so that the TOC density Dtc1 is increased. While, when the total density X is lower than the allowance $\epsilon$ x, the control of the steps ST4, ST5 and ST8 is repeated to be stable.

When the TOC density Dtc1 is abruptly increased owing to variation of condition of the raw water or the like, the DO required for oxidizing the TOC is short. Accordingly, the judgment at the step ST5 is NO and that at the step ST6 is NO (within a range Rins in FIG. 4), so that the control proceeds to a step ST9 to judge whether the absolute value of the difference between the TOC density Dtc1 and the previously measured value Dtc0 is larger than a set judge value $\Delta$ tc and whether the DO density Dd1 is lower than an allowance $\epsilon$ d. At this time, that the judgments at the steps ST5, ST6 and ST9 are NO is never happened under a normal condition, with a result that the judgment at the step ST9 is YES. Then, the control proceeds to a step ST10 to decrease the deaerating power SA. Then, after the control at the step ST8, the control returns to the step ST4. In other words, by decreasing the deaerating power SA, the DO density Dd required for oxidizing increased TOC is maintained and the total density X is made not to exceed the allowance $\epsilon$ x (within the range Ropt in FIG. 4). The deaerating power SA is decreased in direct proportion to $|X1 - \epsilon x|$.

When the Judgment at the step ST9 is NO, it means irregularity such as defect of a sensor. Therefore, the control proceeds to a step ST11 to give an alarm.

According to the first embodiment, the measured results of the densities of TOC and DO at the outlet $8b$ of the pure water manufacturing device A are inputted to the data processing device 7, and the vacuum of the deaerator 1 is controlled so that the total density of TOC and DO is minimized. Thus, the densities of TOC and DO in the pure water are decreased.

The TOC density measuring device 5 measures the TOC density by oxidation after implant of hydrogen peroxide or by automatic titration with other oxidizing agent. In case where the TOC density is measured in such a manner that an ion-density increase caused at oxidation of the TOC by irradiating ultraviolet-ray to sample pure water is detected as a resistivity decrease, there hardly exists DO in the pure water at the outlet 8b of the pure water manufacturing device A. This makes the measurement inaccurate. Therefore, the TOC density is measured not continuously but periodically per three minutes in this embodiment. Though the TOC density in deionized water to be raw water varies in some degree, a variation speed thereof is generally so low that the measuring period can be set larger according to the variation speed.

In the first embodiment, the ultrapure water obtained at the outlet 8b of the pure water manufacturing device A has at least 18M $\Omega$ cm resistivity at a temperature of 25° C., and the densities of TOC and DO are respectively not exceeding 5 ppb and 1 ppb, thus a stable control is executed even if the TOC density in the deionized water :at the inlet 8a varies.

In the first embodiment, the deaerating power of the deaerator 1 is adjusted so that the total density of TOC and DO at the outlet 8b is minimized. However, it is possible to change a characteristic of the pure water according to a purpose of the manufactured ultrapure water. As indicated by a solid line in FIG. 4, when the TOC density before oxidation is about 60 ppb, for example, the TOC cannot be oxidized with extremely low DO density at the outlet 8b of the deaerator 1 with high deaerating power. As a result, the TOC density in the pure water after treatment is not decreased further than a certain value without oxidation of TOC. On the other hand, when the DO density is high, the TOC density is lowered with oxidation. The DO density required for oxidizing all TOC having 60 ppb density at the inlet 8a is estimated to be about 90 ppb. This means that the TOC density cannot be decreased less than about 1 ppb due to detection accuracy of the measuring device but when the DO density before oxidation exceeds 90 ppb, the DO density after elimination of the TOC (broken line in FIG. 4) increases to supply surplus oxygen.

Therefore, when pure water with low DO density of about 1 ppb is required, the deaerating power of the deaerator 1 is increased. In this case, since there exists insufficient oxygen at oxidation, the TOC density varies between 7 and 20 ppb because of the variation of the TOC density in the water-to-be-treated before oxidation.

It is possible to decrease the TOC density to not more than 1 ppb by setting the DO density at the outlet of the deaerator 1 comparatively high. In this case, also, the DO density depends on the TOC density in the water-to-be-treated before oxidation and varies between 10 and 30 ppb.

(SECOND EMBODIMENT)

Figure 5:
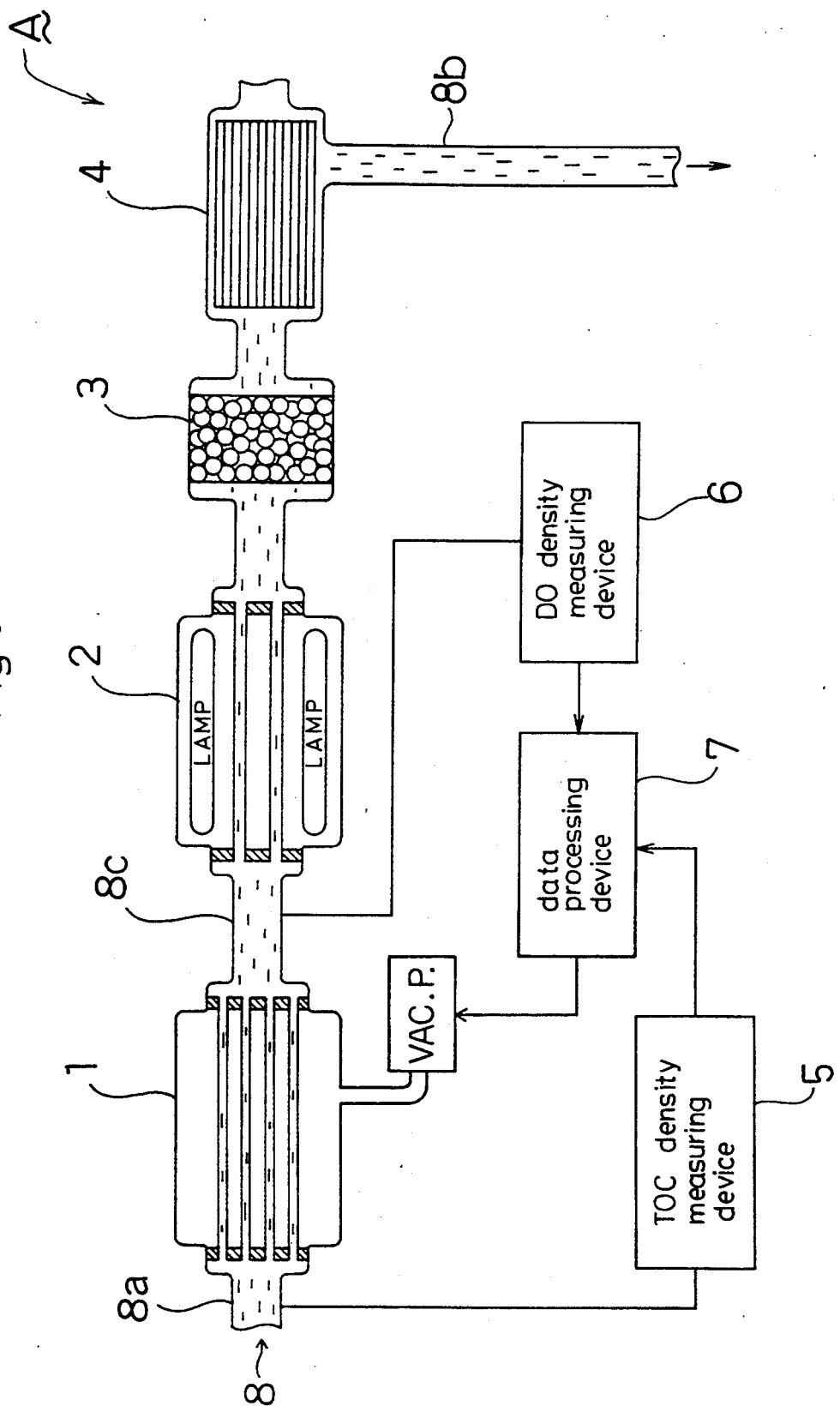
FIG. 5 is a diagram showing a construction of a pure water manufacturing device according to a second embodiment.

Described next is about the second embodiment. FIG. 5 shows a construction of a pure water manufacturing device according to the second embodiment, wherein the equipments provided therein are basically the same as in the first embodiment. The differences from the first embodiment are only that the TOC density is measured at a vicinity of the inlet 8a of the deaerator 1, namely the TOC density is measured in the ion exchanged water of raw water, and that the DO density is measured at the outlet 8c of the deaerator 1. The data processing device 7 serves as power control means and adequate power calculating means.

The DO density in the deionized water is at least 100 ppb which is a sufficient amount for oxidizing the TOC by irradiating ultraviolet-ray in the TOC density measuring device 5. The TOC density measuring device 5 in the first embodiment requires implant of hydrogen peroxide or automatic titration with a titrant as a method of measuring the TOC density, so that the titrant must be periodically supplied to the measuring device. However, in the second embodiment, the TOC density of the ion exchanged water with high DO density is measured at the inlet 8a of the deaerator 1, with a result that the titrant such as hydrogen peroxide is not required.

Figure 6:
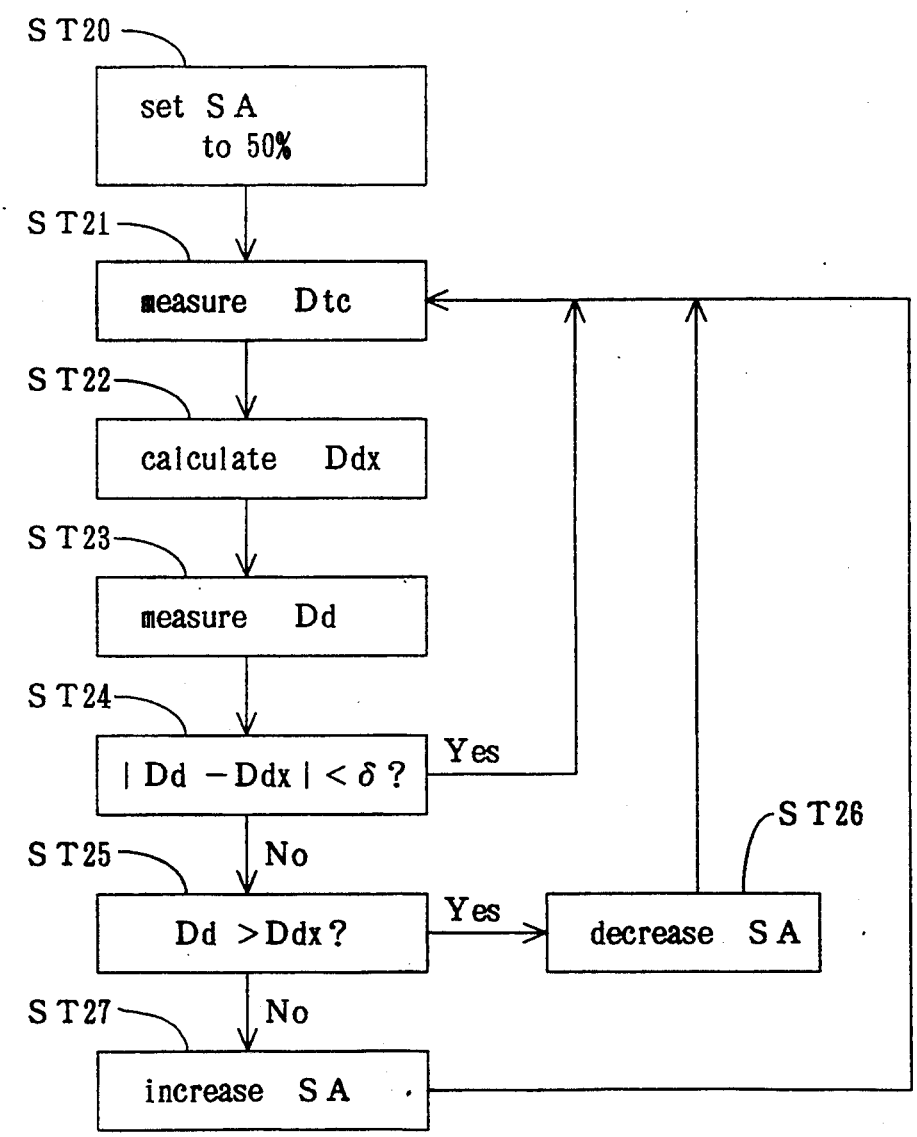
FIG. 6 is a flow chart for controlling the deaerating power of the deaerator in the second embodiment.

FIG. 6 shows a control flow in the second embodiment. At a step ST20, the deaerator 1 starts to work with 50% deaerating power SA. The TOC density Dtc is measured at a step ST21 and the DO density Ddx required for oxidizing the TOC with the density Dtc is calculated at a step ST22.

Then at a step ST23, the DO density Dd is measured, and judged at a step ST24 is whether an absolute value $|Dd-Ddx|$ of a difference between the DO density at the present time and the DO density Ddx required for oxidizing the TOC is smaller than a set allowance $\delta$. When the judgment is NO, judged at a step ST25 is whether Dd>Ddx. When Dd>Ddx, that is, when the DO density Dd is too high, the deaerating power SA is decreased at a step ST26. Then, when Dd$\leq$Ddx, the deaerating power SA is increased at a step ST27 and the control returns to the step ST21 to repeat the steps ST21-ST25. By the control, the DO density Dd is adjusted to a sufficient density for oxidizing the TOC with the TOC density Dtc. When the judgment at the step ST24 is YES, the control immediately proceeds to the step ST21 to repeat the steps ST21-24 of stable control state.

In the above control, the sampling period of the control is set to two minutes and the decrease of the deaerating power is directly proportioned to $|Dd-Dx|$, but PID control may be applied. In this case, even if the TOC density is measured according to the automatic titration which requires several minutes for one measurement, there is no matter because of the low variation speed of the TOC density.

In the second embodiment, the deaerating power of the deaerator 1 is adjusted so that the DO density at the outlet 8c of the deaerator 1, i.e., the inlet of the oxidation device 2 is proportionated to the TOC density. The DO density is controlled by controlling vacuum of the deaerator 1, inputting the measured results to the data processing device 7. The DO density required for oxidizing all the TOC is automatically determined by previously inputting to the data processing device 7 researched results of relation between the minimum TOC density in the ultrapure water and the DO density.

The TOC density may be measured at the outlet 8c of the deaerator 1. In the second embodiment, since the TOC density is measured at the inlet 8a of the deaerator 1, the TOC density at the outlet 8c of the deaerator 1 is different from that at the inlet 8a thereof by an amount of TOC generated at the deaerator 1 thereafter. However, since the amount of TOC generated at the deaerator 1 is almost constant, the difference is easily compensated.

According to the second embodiment, the maintainability is superior because of no requirement of the titrant supply to the TOC measuring device 5. Further, since the measured results of the TOC density can be inputted to the deaerator 1 on real time, the deaerating power to the variation of the TOC density of the raw water is feed-forward-controlled, which prevents hunting, without instability due to time delay of the control system. Wherein, the control accuracy is superior in the first embodiment to that in the second embodiment according to the variation of the TOC density accompanied by the variation of kinds of the organic matter composing the TOC.

Discussed are measured results of the quality of the ultrapure water obtained in the second embodiment. In case with the same ion exchanged water of the raw water as in the first embodiment, the obtained ultrapure water has at least 18M Ω cm resistivity at the temperature of 25° C., and the densities of TOC and DO are respectively no more than 5 ppb. When the conditions are set more strictly, the densities of TOC and DO can be further decreased. In general, since the components of organic matter do not vary so severe (a severe variation thereof causes high TOC density), the pure water with extremely less impurity is obtained by adjusting the DO density in proportion to the TOC density.

In the second embodiment, the deaerating power is controlled at first to 50% at the step ST20. The deaerating power at first may be set to 0% or 100%. With 50% deaerating power, the stable condition can be rapidly obtained under a usual condition.

Further, in the second embodiment, the DO density before oxidation is monitored at the outlet of the deaerator 1 by the DO density measuring device 6 so as to proportionate to the TOC density. When the DO density in the water-to-be-treated is almost constant, the vacuum of the deaerator 1 may be controlled according to the TOC density. In detail, a data that the DO density at the outlet is decreased as the pressure decreases is inputted to the data processing device 7 and the DO density in the water-to-be-treated is adequately maintained with a pretreatment using a degasifier or the like.

In each embodiment, deaerator 1, the oxidation device 2, the ion eliminating device 3 and the particle eliminating device 4 are provided at the flow passage 8 into which the pure water flows. However, the present invention is not limited to the arrangement but a batch system in which the equipments are arranged separately without the flow passage 8 may be applied.

In case where the ultrapure water is used at a cleaning process in a ultra LSI manufacturing process, durability of a gate oxide layer is enhanced with a reduced TOC remaining on the surface of the substrate. By decreasing the DO in the pure water, generation of a natural oxide layer formed on the surface during cleaning with the pure water is prevented. This leads to stable contact resistance and stable film thickness at formation of extremely thin gate oxide layer. Further prevented is a water mark formed when the substrate is dried, which enhances manufacturing yield.

We claim:

1. A pure water manufacturing device for manufacturing high-purity pure water by eliminating dissolved oxygen (DO) and total organic carbon (TOC) in water-to-be-treated, comprising:
   a DO eliminating device having a power variable mechanism;
   a TOC eliminating device having a mechanism for oxidizing TOC utilizing DO in the water-to-be-treated after treatment by said DO eliminating device;
   a DO density detecting means for detecting a density of DO remaining in the water-to-be-treated after treatment by said TOC eliminating device;
   a TOC density detecting means for detecting a density of TOC in the water-to-be-treated after treatment by said TOC eliminating device; and
   a data processing device means for receiving outputs of said TOC density detecting means and said DO density detecting means and for feedback controlling the power of said DO eliminating device so as to minimize total densities of DO and TOC after treatment by said TOC eliminating device.

2. A pure water manufacturing device for manufacturing high-purity pure water by eliminating dissolved oxygen (DO) and total organic carbon (TOC) in water-to-be-treated, comprising:
   a DO eliminating device having a power variable mechanism;
   a TOC eliminating device having a mechanism for oxidizing TOC utilizing DO in the water-to-be-treated after treatment by said DO eliminating device;
   a DO density detecting means for detecting a density of DO remaining in the water-to-be-treated after treatment by said DO eliminating device;
   a TOC density detecting means for detecting a density of TOC in water-to-be-treated; and
   a data processing device means for receiving outputs of said TOC density detecting means and said DO density detecting means and for controlling the power of said DO eliminating device so that the detected DO density by said DO density detecting means is sufficient to oxidize TOC in the water-to-be-treated based on an experimentally obtained relation between densities of TOC and DO before said TOC eliminating device.

3. A method of manufacturing high-purity pure water by eliminating dissolved oxygen (DO) and total organic carbon (TOC) in water-to-be-treated, comprising the steps of:
   eliminating a part of DO in the water-to-be-treated;
   oxidizing and eliminating TOC using DO in the water-to-be-treated which remains after said DO eliminating step; and
   controlling said eliminating of a part of the DO in response to densities of the TOC and the DO monitored in the water-to-be-treated after said TOC oxidizing and eliminating step so as to minimize total values of monitored TOC and DO.

4. A method of manufacturing high-purity pure water by eliminating dissolved oxygen (DO) and total organic carbon (TOC) in water-to-be-treated, comprising the steps of:
   eliminating a part of DO in the water-to-be-treated;
   oxidizing and eliminating TOC by using remaining DO in the water-to-be-treated after treatment by said DO eliminating step; and
   controlling said eliminating of a part of DO to leave remaining DO sufficient to oxidize TOC monitored in the water-to-be-treated based on an experimentally obtained relation between densities of TOC and DO before said TOC oxidizing and eliminating step.

* * * * *